United States Patent [19]

Rasshofer

[11] Patent Number: 4,525,534

[45] Date of Patent: Jun. 25, 1985

[54] POLYAMINES AND A SINGLE-STAGE PROCESS FOR THE PRODUCTION THEREOF

[75] Inventor: Werner Rasshofer, Cologne, Fed. Rep. of Germany

[73] Assignee: Bayer Aktiengesellschaft, Leverkusen, Fed. Rep. of Germany

[21] Appl. No.: 511,367

[22] Filed: Jul. 6, 1983

[30] Foreign Application Priority Data

Jul. 21, 1982 [DE] Fed. Rep. of Germany ....... 3227219

[51] Int. Cl.$^3$ ...................... C08G 18/08; C08G 18/10
[52] U.S. Cl. .................... 525/127; 525/131; 525/452; 525/453; 525/454; 525/455; 528/53; 528/54; 528/57; 528/60; 528/65; 528/68; 528/499
[58] Field of Search ........ 528/53, 54, 57, 60, 528/65, 68, 499, 61, 64; 525/127, 131, 452, 453, 454, 455; 564/61, 511, 414, 393; 252/182

[56] References Cited

U.S. PATENT DOCUMENTS

| | | | |
|---|---|---|---|
| 2,888,439 | 5/1959 | Simons | 528/59 |
| 3,044,989 | 7/1962 | Shivers, Jr. | 528/372 |
| 3,385,829 | 5/1968 | Heydkamp et al. | 528/68 |
| 3,592,854 | 7/1971 | Potts | 564/414 |
| 3,625,871 | 12/1971 | Traubel et al. | 521/63 |
| 3,808,250 | 4/1974 | Blahak et al. | 521/163 |
| 3,865,791 | 2/1975 | Brinkmann et al. | 260/77.5 CH |
| 4,129,741 | 12/1978 | Schmidt et al. | 560/30 |
| 4,153,801 | 5/1979 | Schmidt et al. | 548/312 |
| 4,163,831 | 8/1979 | Gessell | 526/153 |
| 4,169,206 | 9/1979 | Mazanek et al. | 560/50 |
| 4,172,050 | 10/1979 | Gessell | 252/431 R |
| 4,180,644 | 12/1979 | Marquis et al. | 528/73 |
| 4,198,348 | 4/1980 | Bertini et al. | 564/414 |
| 4,224,417 | 9/1980 | Hajek et al. | 414/693 |
| 4,386,218 | 3/1983 | Rasshofer et al. | 528/68 |
| 4,418,160 | 11/1983 | Rasshofer et al. | 528/65 |

FOREIGN PATENT DOCUMENTS

| | | |
|---|---|---|
| 71834 | 5/1893 | Fed. Rep. of Germany . |
| 2948419 | 8/1981 | Fed. Rep. of Germany . |
| 920475 | 3/1963 | United Kingdom . |
| 1033912 | 6/1966 | United Kingdom . |
| 1117494 | 6/1968 | United Kingdom . |

OTHER PUBLICATIONS

Patent Abstracts of Japan Band 3, Nr. 152, Dec. 14, 1979, p. 122C67 and Japanese 15-130525.
Patent Abstracts of Japan Band 3, Nr. 138, Nov. 16, 1979, p. 124C64 and Japanese 54-117580.
H. John, J. Prakt Chemie 130, 314 et seq. 332 et seq. (1931).

*Primary Examiner*—John Kight
*Assistant Examiner*—K. Morgan
*Attorney, Agent, or Firm*—Gene Harsh; Joseph C. Gil; Lyndanne M. Whalen

[57] ABSTRACT

Polyamines containing aromatic and/or aliphatic primary amino groups are produced by hydrolyzing an isocyanate compound in the presence of water, an insoluble basic compound as a catalyst and a water-miscible solvent in a single reaction step. The isocyanate compound has an NCO-content of from 0.5 to 40 wt % and is preferably a prepolymer. The (pH-) basic compound is substantially insoluble in both water and the organic solvents generally used in such processes. An isocyanate-reactive compound may also be included in the reaction mixture in an amount which is from 0.1 to 15 wt % (based on isocyanate compound). The hydrolysis reaction is generally carried out at a temperature from 50° to 165° C. in a manner such that the reaction mixture remains substantially homogeneous. The product polyamines contain from 0.19 to 20.3 wt % primary amino groups. These polyamines are particularly useful in the production of polyurethanes.

13 Claims, No Drawings

POLYAMINES AND A SINGLE-STAGE PROCESS FOR THE PRODUCTION THEREOF

BACKGROUND OF THE INVENTION

This invention relates to a single-stage process for the production of polyamines containing aromatic and/or aliphatic primary amino groups and the products of this process.

It is known that aromatic isocyanates can be converted into primary aromatic amines by acid hydrolysis. However, the conversion is far from complete because the amine formed during hydrolysis further reacts with unreacted isocyanate to form the corresponding urea. This further reaction cannot be suppressed even by using excess strong mineral acid. A recent example of such a procedure is described in Japanese Pat. No. 55 007-827.

German Auslegeschrift No. 1,270,046 describes a process for the production of specific primary aromatic amines containing polyalkylene glycol ether segments. In this disclosed process, reaction products of aromatic di- or triisocyanates with polyalkylene glycol ethers and/or polyalkylene glycol thioethers (preferably those having molecular weights of from 400 to 4000) are reacted with secondary or tertiary carbinols. The products of this reaction are subsequently subjected to thermal decomposition at elevated temperatures in an inert solvent (optionally in the presence of acid catalysts). In addition to the high decomposition temperature, this procedure is disadvantageous in that flammable, readily volatile alkenes are formed during the thermal decomposition of the urethanes. Since these alkenes are explosive in admixture with air, safety measures must be taken.

German Auslegeschrift No. 1,694,152 describes the production of prepolymers containing at least two terminal amino groups by reacting hydrazine, aminophenyl ethylamine or other diamines with an NCO-prepolymer of a polyether polyol and polyisocyanate (NCO:NH-ratio=1:1.5 to 1:5). In this disclosed process, unreacted amine must be carefully removed in a separate step because it catalyzes the reaction with polyisocyanates to a considerable extent, thereby leading to short processing times. The amine may also act as a reactant.

Another possible synthesis of polyamines containing urethane groups is described in French Pat. No. 1,415,317. In this prior art process, NCO-prepolymers containing urethane groups are converted with formic acid into N-formyl derivatives which are subsequently hydrolyzed to form terminal aromatic amines. According to German Auslegeschrift No. 1,155,907, the reaction of NCO-prepolymers with sulfamic acid also leads to compounds containing terminal amino groups. Relatively high molecular weight preadducts containing aliphatic, secondary and primary amino groups may be obtained according to German Auslegeschrift No. 1,215,373 by reacting relatively high molecular weight hydroxyl compounds with ammonia under pressure at elevated temperature in the presence of catalysts. U.S. Pat. No. 3,044,989 teaches that such preadducts may be produced by reacting relatively high molecular weight polyhydroxyl compounds with acrylonitrile, followed by catalytic hydrogenation. Relatively high molecular weight compounds containing terminal amino groups and urethane groups may also be obtained by reacting NCO-prepolymers with enamines, aldimines or ketimines containing hydroxyl groups, followed by hydrolysis (German Offenlegungsschrift No. 2,546,536 and U.S. Pat. No. 3,865,791). Another possible synthesis for aromatic polyamines containing urethane and ether groups is the opening of the ring which occurs in the reaction of isatoic acid anhydride and diols. Polyamines of this type are described, for example, in U.S. Pat. No. 4,180,644 and in German Offenlegungsschriften No. 2,019,432; 2,619,840; 2,648,774 and 2,648,825. However, the poor reactivity of such aromatic ester amines is disadvantageous in numerous applications.

Reaction of nitroaryl isocyanates with polyols, followed by reduction of the nitro groups to aromatic amino groups, is also known (U.S. Pat. No. 2,888,439). This process is disadvantageous in that the reduction step is quite expensive.

It is also known that certain heteroaromatic isocyanic acid esters can be converted into heteroaromatic amines by basic hydrolysis. Unfortunately, the hydrolysis conditions described by H. John in J. Prakt. Chemie 130, 314 et seq and 332 et seq (1931) for two specific, heteroaromatic monoisocyanic acid esters are not only totally unsuitable for the conversion of poly-NCO-compounds into aliphatic and/or aromatic amines, they are also dangerous.

Two of our own proposals (see, German Offenlegungsschriften Nos. 2,948,419 and 3,039,600) are multi-stage processes for the production of polyamines by the alkaline hydrolysis of NCO-prepolymers with excess aqueous alkali hydroxides at low temperatures to form carbamates. The carbamates are then acidified with mineral acids or ion exchanger resins in equivalent quantities or in quantities exceeding the quantity of base to decompose the carbamates. The acidified mixture may then be neutralized with a base and the polyamines subsequently isolated.

The above-described processes for the production of polyamines are all complicated. It would therefore be desirable to further simplify production of polyamines in an economically more favorable manner. A significant advantage in this respect would be afforded by a single-stage process as opposed to the customary multistage processes. Further advantages would lie in the absence of salts formed so that a filtration step for finely particulate salts would not be required.

Until now, all attempts to obtain satisfactory yields of polyamines by direct hydrolysis of polyisocyanates in a single-stage have been unsuccessful. Instead of the desired hydrolysis products, the products obtained are partially inhomogeneous, do not flow freely and contain urea groups with very few, if any, amino groups. The reason for this may be attributable to the fact that the isocyanate/amine reaction is considerably faster than the isocyanate/water reaction. For this reason, the hydrolysis reaction catalyzed by alkali hydroxides has been carried out at the lowest possible temperatures and the alkali carbamates inevitably formed have been subsequently decomposed by heat treatment or by treatment with an acid.

SUMMARY OF THE INVENTION

It is an object of the present invention to provide a single-stage process for the production of polyamines containing aromatic and/or aliphatic primary amino groups.

It is also an object of the present invention to provide polyamines containing from 0.19 to 20.3 wt. % NH₂ groups.

It is another object of the present invention to provide a single-stage process for the production of polyamines containing primary amino groups which process is economically more favorable than the prior art processes.

These and other objects which will be apparent to those skilled in the art are accomplished by hydrolyzing a mixture of an isocyanate compound, water, an insoluble basic compound as a catalyst and a water-miscible solvent. The isocyanate group-containing compound has an NCO-content of from 0.5 to 40 wt %. The basic compound is substantially insoluble in both water and the organic solvents typically used in such processes. A compound containing from 1 to 4 isocyanate-reactive hydrogen atoms and having a molecular weight of from 32 to 2,000 may also be included in the mixture in an amount of from 0.1 to 15 wt % (based on isocyanate compound). Appropriate insoluble (pH-) basic compounds include insoluble alkaline earth carbonates, insoluble earth metal oxides, insoluble dioxides of the spinel type, alkaline earth silicates, alkaline earth metal silicates and organic high molecular weight anion exchanger resins. Preferred water-miscible solvents boil below 250° C. and contain at least one of the following groups: cyclic carboxylic acid-N,N-dialkylamide, acyclic carboxylic acid-N,N-dialkylamide, lactam, tetraalkyl urea, sulfone, sulfoxide, phosphoric acid-N,N-dialkylamide, nitrile, keto and ether groups.

DETAILED DESCRIPTION OF THE INVENTION

It has now surprisingly been found that hydrolysis of polyisocyanates in a single stage does lead directly to polyamines if the reaction is carried out both in the presence of weakly basic to strongly basic inorganic or organic catalysts which are insoluble both in water and also in all the usual organic solvents, (for example basic aluminum hydroxide or basic ion exchanger resins) and in the presence of water-soluble solvents (such as dioxane, tetrahydrofuran, dimethyl formamide or acetonitrile). The hydrolysis reaction should be carried out at elevated temperatures (for example at 50° to 165° C. and preferably at 80° to 130° C. or at the boiling points of the solvent mixture) in order to suppress the formation of ureas. Surprisingly, more urea groups are formed in the process of the present invention at lower temperatures (for example at room temperature) than at the high temperatures. It was not expected that the formation of ureas would be largely suppressed under the elevated temperature conditions of the present invention because where alkali hydroxides (soluble catalysts) had been used in the prior art, there was a marked increase in the formation of ureas at such elevated temperatures.

In the process of the present invention, water-soluble solvents are used to obtain a substantially homogeneous solution of the reactants, namely the NCO-compound and water. Particularly suitable solvents are dimethyl formamide, dioxane, dimethoxy ethane, acetone and acetonitrile.

It is known (German Auslegeschrift No. 1,235,499) that solutions of NCO-prepolymers in dimethyl formamide can be converted with substantially equivalent quantities of water (80 to 120% of the theoretical), accompanied by chain extension through urea groups, into highly viscous solutions which are suitable for spinning elasthane filaments or for coatings. The reaction of the NCO-compounds with excess quantities of water to form almost exclusively low molecular weight amines under the conditions of the present invention was therefore surprising.

It is also known that isocyanates react with dialkyl formamides at elevated temperatures to form formamidines (H. Ulrich et al, J. Org. Chem. 33, 3928–3930 (1968)). Even this reaction does not interfere with the smooth hydrolysis reaction by which the polyamines are formed in the process of the present invention if dialkyl formamides are used as solvents for the NCO-prepolymers.

A significant advantage of the process of the present invention lies in the fact that where the catalysts appropriate to the present invention are used, no salts are formed. Thus, the catalysts used may be re-used as required without any difficulty after filtration. Removal of the catalysts may readily be carried out with advantage by filtration from the reaction mixture of the polyamines. There is no need for complicated distillation processes. The only secondary product of the hydrolysis reaction is gaseous carbon dioxide.

The process of the present invention is also particularly suitable for the hydrolysis of NCO-prepolymers based on polyesters because the mild reaction conditions do not result in any significant cleavage of the ester group during the hydrolysis reaction. The catalysts used in accordance with the present invention are commercially readily obtainable inexpensive catalysts which may optionally be re-used after separation. These catalysts also show very little, if any, chemical interaction with alkali-hydrolyzable solvents, such as dimethyl formamide. In contrast, where strongly basic alkali hydroxides are used, a solvent such as dimethyl formamide undergoes distinct hydrolysis.

More specifically, the present invention relates to a process for the production of primary polyamines containing organic and/or aliphatic amino groups by the hydrolysis of compounds containing free isocyanate groups in a single stage. This is accomplished by mixing compounds containing aromatic and/or aliphatic, free NCO-groups (NCO-content 0.5 to 40 wt %, preferably 1.2 to 25 wt % and, more preferably, 1.5 to 15 wt %), optionally in solution in an organic, NCO-inert water-miscible solvent, water, an insoluble basic compound (base) and a water-miscible solvent. From 0.1 to 15 wt % (based on isocyanate compound) of at least one compound containing 1 to 4 NCO-reactive H-atoms and having a molecular weight in the range from 32 to 2000 may also be included in this mixture. The insoluble basic compound is an organic or inorganic compound which is substantially insoluble both in water and in all the usual organic solvents. The water-miscible solvent preferably contains carboxylic acid dialkylamide, lactam, tetraalkyl urea, sulfone, sulfoxide, phosphorus dialkylamide, nitrile, keto and ether groups, more preferably carboxylic acid dialkylamide, ether, keto and nitrile groups. This solvent is generally used in quantities of ≧10 parts by weight, preferably in quantities of ≧20 parts by weight and, more preferably, in quantities of ≧40 parts by weight of solvent to 100 parts of isocyanate compound. The hydrolysis reaction is generally carried out at temperatures below 165° C. and preferably at temperatures in the range from 80° to 130° C.

The present invention also relates to a process for the production of primary polyamines containing aromatic and/or aliphatic amino groups by this process.

In the process of the present invention, it is particularly preferred to use at least 40 parts of water plus insoluble basic compound plus solvent plus isocyanate-reactive compound to 60 parts of isocyanate compound and to maintain the reaction mixture in a homogeneous phase at the reaction temperature. The insoluble basic compound is heterogeneously distributed in the reaction phase.

By using the insoluble catalysts of the present invention, it is possible to avoid the disadvantages of liquid and volatile tertiary amines or at least partly water-soluble crystalline basic compound catalysts. The reaction may therefore be carried out continuously. Where tertiary amines are used, however, elaborate condensation precautions have to be taken to ensure complete recovery; in addition, discoloration readily occurs. Where partly soluble catalysts, such as potassium hydrogen carbonate or sodium carbonate are used, undissolved and dissolved fractions of catalyst often occur so that the basic catalyst must be filtered off twice. Small amounts of residual catalyst may therefore remain in the amine product.

In the present invention, small quantities (i.e., between 0.1 and 15 wt %) of an isocyanate-reactive compound containing one, two or more hydroxy and/or amino and/or thiol groups attached to aliphatic, cycloaliphatic or aromatic radicals may be used in the hydrolysis reaction. The use of these compounds containing H-active groups is advantageous in that polyamines substantially free from monomeric polyamine can be produced from NCO-compounds containing low molecular weight polyisocyanates (for example, NCO-semiprepolymers) without treating the NCO-compounds by thin-layer distillation or similar processes. It is thus readily possible to produce modified polyamines which also contain on one polyamine molecule segments (optionally of different types) attached through urethane groups, thiourethane groups or urea groups. By using a trifunctional or higher compound containing "H-active groups" in the NCO-hydrolysis reaction, it is possible to obtain a trifunctional or higher polyamine from, for example, a difunctional NCO-compound.

The present invention also relates to polyamines containing from 0.19 to 20.3 wt %, preferably from 0.46 to 11.3 wt % and, most preferably, from 0.58 to 6.7 wt % primary amino groups obtained by the process of the present invention. Polyamines containing aromatically bound primary amino groups of NCO-compounds containing aromatically bound NCO-groups are preferred, polyamines of NCO-compounds based on tolylene diisocyanates are particularly preferred.

The present invention also relates to the use of the polyamines obtained by the process of the present invention for the production of polyurethanes, optionally cellular polyurethane plastics and polyurethane foams. Such polyurethanes may be produced by reacting polyisocyanates and/or blocked polyisocyanates (including the NCO-prepolymers) with the polyamines of the present invention and, optionally, other low molecular weight and/or relatively high molecular weight compounds containing isocyanate-reactive groups, optionally in the presence of auxiliaries and additives known to those in the art and/or solvents.

The NCO-compounds containing two or more aromatic, heterocyclic and/or aliphatic (preferably aromatic) NCO-groups suitable for use in the process of the present invention (hereinafter referred to as "NCO-compounds") include: modified polyisocyanates of the type formed by the partial conversion of the isocyanate groups into urethane, urea, biuret, uret dione, isocyanurate and/or uretone imine groups; so-called NCO-prepolymers of poly-functional compounds containing NCO-reactive H-groups and having a molecular weight in the range from 62 to 12,000 and preferably from 400 to 6000 and (excess) quantities of aromatic polyisocyanates; and "semiprepolymers" of NCO-prepolymers and other low molecular weight polyisocyanates.

Examples of suitable modified aromatic polyisocyanates are: polyisocyanates containing urethane groups (formed by modification with low molecular weight polyols); polyisocyanates containing urea groups (water-modified, German Pat. No. 1,230,778); polyisocyanates containing biuret groups (U.S. Pat. Nos. 3,124,605 and 3,201,372; British Pat. No. 889,050); polyisocyanates containing isocyanurate groups (German Pat. Nos. 1,022,789 and 1,222,067); and dimeric or oligomeric polyisocyanates containing uret dione or uretone imine groups. These modified polyisocyanates are known compounds and may be obtained by known methods. Several uret dione polyisocyanates are described in Analytical Chemistry of the Polyurethanes, Vol. 16/III, High-Polymers-Series (Wiley, 1969). Polyisocyanates containing carbodiimide groups are also suitable.

Such modified polyisocyanates containing urethane and/or urea and/or biuret and/or uret dione and/or isocyanurate and/or uretone imine groups suitable for use in the process of the present invention generally have an NCO-content of from 5 to 40 wt % and preferably from 10 to 25 wt %.

The NCO-compounds used in the process of the present invention are preferably NCO-prepolymers which may be obtained by reacting low molecular weight and/or relatively high molecular weight hydroxy and/or amino and/or thiol group compounds containing reactive groups (molecular weight 62 to approximately 12,000) with an excess of polyisocyanate in known manner.

Polyisocyanates suitable for use in the production of compounds containing free NCO-groups are, in principle, any aromatic, aliphatic and heterocyclic polyisocyanates of the type described, for example, by W. Siefken in Justus Liebigs Annalen der Chemie, 562, pages 75 to 136. Examples of such polyisocyanates are those corresponding to the formula $Q(NCO)_n$, in which $n=2$ to 4 (preferably 2) and Q represents a hydrocarbon radical containing from 4 to 15 carbon atoms; an aromatic hydrocarbon radical containing from 6 to 15 (preferably from 6 to 13) carbon atoms such as 1,3- and 1,4-phenylene diisocyanate, 2,4- and 2,6-tolylene diisocyanate and mixtures of these isomers, diphenyl methane-2,4'- and/or -4,4'- and/or -2,2'-diisocyanates, including the mono- to tetra-$C_1$-$C_8$-alkyl- and/or chlorine-substituted derivatives, and naphthylene-1,5-diisocyanate. Other suitable diisocyanates are the 2,4'-diisocyanatodiphenyl sulfides described in German Offenlegungsschrift No. 2,922,966 and the alkyl-substituted diphenyl methane diisocyanates described for example in European Pat. No. 24,665 and in German Offenlegungsschrift No. 2,935,318. Aliphatic and/or cycloaliphatic polyisocyanates, such as 1,6-hexane diisocyanate, lysine methyl ester diisocyanate, isophorone diisocyanate, the dicyclohexyl methane diisocyanate isomers or biuret-containing or isocyanurate-containing trifunctional polyisocyanates based on hexane-1,6-diisocyanate or isophorone diisocyanate may also be used.

Other suitable polyisocyanates are triphenyl methane-4,4',4''-triisocyanate, polyphenyl polymethylene polyisocyanates (obtained by condensing aniline with formaldehyde, followed by phosgenation as described in British Pat. Nos. 874,430 and 848,671); m- and p-isocyanatophenyl sulfonyl isocyanates; perchlorinated aryl polyisocyanates; polyisocyanates containing isocyanurate groups; polyisocyanates containing urethane groups (described, for example, in Belgian Pat. No. 752,261 or in U.S. Pat. Nos. 3,394,164 and 3,644,457); polyisocyanates containing acylated urea groups (German Pat. No. 1,230,778) and polyisocyanates produced by telomerization reactions (described, for example, in U.S. Pat. No. 3,654,196). It is also possible to use diaryl alkylene diisocyanates obtained by the polymerization of acrylonitrile and, optionally, other ethylenically unsaturated monomers in the diaryl alkylene diisocyanates using the method according to European Patent Application No. 37,112 (U.S. Pat. No. 4,283,500). The polymer-modified polyisocyanates described in European Patent Application No. 37,112 are also suitable.

In general, it is preferred to use commercially readily available polyisocyanates such as 2,4- and 2,6-tolylene diisocyanate and mixtures of these isomers ("TDI"); polyphenyl polymethylene polyisocyanates of the type produced by condensing aniline with formaldehyde, followed by phosgenation ("crude MDI"); and polyisocyanates containing urethane groups, isocyanurate groups or urea groups ("modified polyisocyanates"). The modified polyisocyanates derived from 2,4- and/or 2,6-tolylene diisocyanate (TDI) and from 4,4'- and/or 2,4'- and/or 2,2'-diphenyl methane diisocyanate (MDI) are particularly preferred. From a technical point of view, TDI and MDI (or their isomer mixtures) are most preferred for production of the NCO-prepolymers.

The isocyanate-reactive compounds used in the production of the NCO-prepolymers are preferably relatively high molecular weight compounds having a molecular weight in the range from 400 to 12,000 (more preferably from 400 to 6000) and containing at least 1.9 (preferably from 2 to 4 and, more preferably, from 2 to 3) reactive hydroxyl, amino and/or thiol groups (preferably hydroxyl groups) as reactive "H-active" groups per mole. Suitable compounds of this type are, for example, the polyacetals, polythioethers, polycarbonates, polyamides, polysiloxanes and/or polybutadienes containing isocyanate-reactive groups which are commonly encountered in polyurethane chemistry. Polyesters, polylactones and polyethers are particularly preferred. Polyethers containing hydroxyl groups are most preferred.

Polyethers containing at least two, generally two to eight and preferably two to three hydroxyl groups which are preferably used in the present invention are known. Such polyethers may be obtained, for example, by polymerizing epoxides (such as ethylene oxide, propylene oxide, butylene oxide, styrene oxide or epichlorohydrin) or tetrahydrofuran themselves in the presence of Lewis catalysts (such as BF$_3$) or by addition of these epoxides (preferably ethylene oxide and propylene oxide) optionally in admixture or successively, with starter components containing reactive hydrogen atoms. Appropriate starter components are: water; ammonia; alcohols such as ethylene glycol, 1,3- or 1,2-propane diol, trimethylol propane, glycerol, sorbitol, 4,4'-dihydroxydiphenyl propane; and amines such as aniline, ethanolamine or ethylene diamine. Sucrose polyethers and formitol-started or formose-started polyethers may also be used in the practice of the present invention. In many cases, it is preferred to use polyethers of the type which contain predominantly primary OH-groups (up to 90 wt %, based on all the OH-groups present in the polyether).

Polybutadienes containing OH—, NH— and/or SH— groups are also suitable for use in accordance with the present invention (see Progress Org. Coatings, Vol. 7 (3), 289–329 (1979)).

Suitable polyacetals are, for example, the compounds obtainable from glycols, such as di- or tri-ethylene glycol, 4,4'-dihydroxyethoxy diphenyl methane, hexane diol and formaldehyde; or by the polymerization of cyclic acetals, such as trioxane.

Suitable polycarbonates containing hydroxyl groups are known and may be obtained, for example, by reacting diols (such as 1,3-propane diol, 1,4-butane diol and/or 1,6-hexane diol, di-, tri- or tetra-ethylene glycol or thiodiglycol) with diaryl carbonates (for example diphenyl carbonate) or phosgene (German Auslegeschriften Nos. 1,694,080, 1,915,908 and 2,221,751; German Offenlegungsschrift No. 2,605,024).

Preferred polyesters of dicarboxylic acids and diols are those of adipic acid and (less preferably) isophthalic acid and straight-chain and/or branched diols, also lactone polyesters, preferably based on caprolactone and starter diols (such as for example diethylene glycol or 1,6-hexane diol).

Suitable polythioethers include the condensation products of thiodiglycol on its own and/or with other glycols.

Polyhydroxyl compounds already containing urethane or urea groups and optionally modified natural polyols may also be used. Addition products of alkylene oxides with phenol-formaldehyde resins or even with urea-formaldehyde resins may also be used in accordance with the present invention. It is also possible to introduce amide groups into the polyhydroxyl compounds as described for example in German Offenlegungsschrift No. 2,559,372.

In accordance with the present invention, it is also possible to use polyhydroxyl compounds containing high molecular weight polyadducts and polycondensates or polymers in finely dispersed or dissolved form. Polyhydroxyl compounds such as these may be obtained, for example, by carrying out polyaddition reactions (for example reactions between polyisocyanates and amino-functional compounds) and polycondensation reactions (for example between formaldehyde and phenols and/or amines) in situ in the above-described compounds containing hydroxyl groups. Processes such as these are described, for example, in German Auslegeschriften Nos. 1,168,075 and 1,260,142; and in German Offenlegungsschriften Nos. 2,324,134; 2,423,984; 2,512,385; 2,513,815; 2,550,796; 2,550,797; 2,550,833; 2,550,862; 2,633,293 and 2,639,254. It is also possible according to U.S. Pat. No. 3,869,413 or German Offenlegungsschrift No. 2,550,860 to mix an aqueous polymer dispersion with a polyhydroxyl compound and subsequently to remove the water from the mixture.

Polyhydroxyl compounds modified by vinyl polymers obtained for example by polymerizing styrene and acrylonitrile in the presence of polyethers (U.S. Pat. Nos. 3,383,351; 3,304,273; 3,523,093 and 3,110,695; German Auslegeschrift No. 1,152,536) or polycarbonate polyols (German Pat. No. 1,769,795 and U.S. Pat. No. 3,637,909) are also suitable for use in the process of the present invention.

Representatives of the above-mentioned compounds which may be used in accordance with the present invention are described in High Polymers, Vol. XVI, "Polyurethanes, Chemistry and Technology" by Saunders-Frisch, Interscience Publishers, New York, London, Vol. I, 1962, pages 32 to 42 and pages 44 to 54 and Vol. II, 1964, pages 5-6 and 198-199, and Kunststoff-Handbuch, Vol. VII, Vieweg-Hoechtlen, Carl-Hanser-Verlag, Munich, 1966, for example on pages 45 to 71. It is of course possible to use mixtures of the above-mentioned compounds containing at least two isocyanate-reactive hydrogen atoms and having a molecular weight of from 400 to 12,000, for example mixtures of different polyethers.

Other starting components which may optionally be used in the production of the NCO-prepolymers useful in the process of the present invention are compounds containing at least two isocyanate-reactive hydrogen atoms ("H-active groups") and having a molecular weight in the range from 18 to 399 and preferably in the range from 62 to 399. These compounds contain water and/or hydroxyl groups and/or amino groups and/or thiol groups (preferably hydroxyl groups) and are commonly used as chain-extending or crosslinking agents in polyurethane chemistry. These compounds generally contain from 2 to 8 and preferably from 2 to 4 isocyanate-reactive hydrogen atoms. It is also possible to use mixtures of different compounds containing at least two isocyanate-reactive hydrogen atoms and having a molecular weight in the range from 62 to 399.

Examples of such compounds are: water; ethylene glycol; 1,2- and 1,3-propane diol; 1,4- and 2,3-butane diol; 1,5-pentane diol; 1,6-hexane diol; 1,8-octane diol; neopentyl glycol; 1,4-bis-hydroxymethyl cyclohexane; 2-methyl-1,3-propane diol; dibromobutene diol; glycerol; trimethylol propane; 1,2,6-hexane triol; trimethylol ethane; pentaerythritol; quinitol; mannitol; sorbitol; dianhydrosorbitol; dianhydromannitol; castor oil; di-, tri- and tetraethylene glycol; di-, tri- and tetrapropylene glycol; dibutylene glycol and higher polyethylene; polypropylene or polybutylene glycols having a molecular weight of up to 399; 4,4'-dihydroxydiphenyl propane; dihydroxy ethyl hydroquinone; ethanolamine; diethanolamine; N-methyl diethanolamine; triethanolamine and 3-aminopropanol.

Other low molecular weight polyols suitable for use in accordance with the present invention are mixtures of hydroxy aldehydes and hydroxy ketones ("formose") or polyhydric alcohols obtained therefrom by reduction ("formitol") which are formed in the autocondensation of formaldehyde hydrate (German Offenlegungsschriften No. 2,639,084 and 2,714,084).

Aliphatic diamines suitable for use in accordance with the present invention are: ethylene diamine; 1,4-tetramethylene diamine; 1,6-hexamethylene diamine; 1,12-dodecamethylene diamine and mixtures thereof; 1-amino-3,3,5-trimethyl-5-aminomethyl cyclohexane ("isophorone diamine"); 2,4- and 2,6-hexahydrotolylene diamine and mixtures thereof; perhydro-2,4'- and -4,4'-diaminodiphenyl methane; p-xylylene diamine; bis-(3-aminopropyl)methyl amine; diaminoperhydroanthracenes and cycloaliphatic triamines (German Offenlegungsschrift No. 2,614,244). Hydrazine and substituted hydrazines (for example methyl hydrazine) or dihydrazide compounds may also be used in accordance with the invention.

Examples of aromatic diamines include: diamines containing ether groups (German Offenlegungsschriften Nos. 1,770,525 and 1,809,172 (U.S. Pat. Nos. 3,654,364 and 3,736,295)); 2-halogen-1,3-phenylene diamines optionally substituted in the 5-position; 3,3'-dichloro-4,4'-diaminodiphenyl methane; tolylene diamine; 4,4'-diaminodiphenyl methane; 4,4'-diaminodiphenyl disulfides; diaminodiphenyl dithioethers; aromatic diamines substituted by alkylthio groups (German Offenlegungsschrift No. 2,638,760); aromatic diamines containing sulfonate or carboxylate groups (German Offenlegungsschrift No. 2,720,166); and high-melting diamines (German Offenlegungsschrift No. 2,635,400). Examples of aliphatic-aromatic diamines are the aminoalkyl thioanilines described in German Offenlegungsschrift No. 2,734,574.

Other compounds which may also be used, although less preferably, in the production of the NCO-compounds useful in the present invention are organofunctional polysiloxanes containing two terminal isocyanate-reactive groups and structural units corresponding to the formula —O—Si(R)$_2$—, in which R is a C$_1$-C$_4$-alkyl radical or a phenyl radical, but preferably a methyl radical. Suitable starting materials include both the pure polysiloxanes containing terminal organo-functional groups known in the art and also the siloxane polyoxyalkylene copolymers containing terminal organo-functional groups known to those in the art.

The organopolysiloxanes which are particularly preferred correspond to the general formula

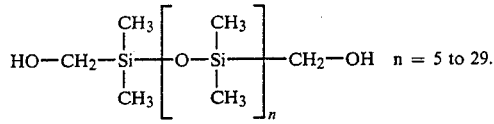

These compounds may be obtained in known manner by equilibration of 1,1,3,3-tetramethyl-1,3-hydroxymethyl disiloxane, which corresponds to the formula

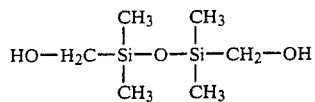

with octamethyl cyclotetrasiloxane in the presence of sulfuric acid or by the process described in German Auslegeschrift No. 1,236,505.

The NCO-prepolymers containing free aromatically bound isocyanate groups may be produced in known manner by reacting the isocyanate and isocyanate-reactive compounds either in the melt or in solution. In either case, the equivalent ratio of NCO-groups to active hydrogen atoms (preferably OH-groups) is greater than 1 and generally between 1.5:1 and 2.8:1. It is of course possible to use an even larger excess of polyisocyanate. The NCO-prepolymers ("NCO-preadducts") generally have an oily to wax-like consistency, depending upon the starting components used. If the NCO-/OH-ratio amounts to more than 2, primarily non-extended NCO-preadducts are obtained, whereas NCO-/OH-ratios below 2 result in an increase in the average molecular weight of the NCO-preadducts. Where low molecular weight polyols are used as chain-extending agents in addition to relatively high molecular weight starting compounds in the production of the NCO-prepolymers, relatively high molecular weight NCO-preadducts are obtained.

If the NCO-prepolymers are subjected to distillation (advantageously using a thin-layer evaporator), the monomeric polyisocyanates are removed so that products containing very little, if any, monomeric diamine are obtained in the process of the present invention.

NCO-prepolymers which have been obtained from relatively high molecular weight polyols (molecular weight 400 to 12,000), preferably polyether polyols, optionally using chain-extending agents (molecular weight 62 to 399) by reaction with aromatic diisocyanates in an equivalent ratio of from 1:1.5 to 1:2.8 (more preferably from about 1:1.5 to 1:2) are preferred isocyanate compounds for the process of the present invention.

The NCO-prepolymers used in the present invention should generally have an NCO-content of from 0.5 to 30 wt %, preferably from 1.2 to 25 wt % and most preferably from 1.5 to 10 wt %. However, so-called "semiprepolymers" (i.e. mixtures of NCO-prepolymers with other free polyisocyanates) which may have an even higher NCO-content, for example up to 40 wt %, may also be used in the process of the invention. For practical and economic reasons, however, it is not advisable to use such semiprepolymers in most cases because the monomeric amines formed from the monomeric polyisocyanates can be troublesome in a number of applications.

The compounds containing free NCO-groups in the form of their modified isocyanates (generally free from urethane groups) or in the form of their NCO-prepolymers (containing urethane groups) or their "semiprepolymers" have a total NCO-group content of from 0.5 to 40 wt %, preferably from 1.2 to 25 wt % and most preferably, from 1.5 to 15 wt %.

The quantity of water used in the present invention should amount to at least 1 mole of water per mole of NCO-group. The quantity of water used is preferably $\geq 5$ times (and more preferably $\geq 10$ times) the stoichiometric quantity. In general, the water is used in a quantity of more than 1 part water for each 100 parts of NCO-compound.

The insoluble catalysts used are (pH-) basic organic or inorganic compounds which are substantially insoluble both in water and also in all the usual organic solvents. Water may already be bound in them. Examples of appropriate catalysts are: the carbonates or oxides of metals of the Second Main Group of the Periodic System of Elements such as calcium carbonate; or insoluble metal oxides of the Third Main Group of the Periodic System of Elements such as basic aluminium oxide. Other suitable insoluble catalysts are the so-called double oxides which may be stoichiometric or non-stoichiometric and which consist at least partly of a metal from the Ist, IInd or IIIrd Main Group of the Periodic System of Elements or a metal oxide containing a rare earth element. Examples of compounds such as these are aluminum silicates, alkaline earth titanates, alkaline earth silicates such as basic magnesium silicate and water-insoluble calcined (polymeric) silicates or oxides of the spinel type.

One example of a base which is regarded as soluble and unsuitable for use in the present invention is soda, although only approximately 0.14 g of $Na_2CO_3$ dissolve in a mixture heated to 90° C. of 250 g of dimethyl formamide and 50 g of water. However, soda is soluble in water on its own.

Other suitable insoluble basic compounds are metallic or non-metallic bases which are chemically or physically immobilized on inorganic or organic supports. Bases such as these include so-called "basic ion exchanger resins" which carry dialkylamino or trialkylammonium hydroxide units on a benzyl group bound in a macromolecular matrix. Suitable products are, for example, the basic ion exchanger resins sold under the designations Lewatit ® 500, 504, MP 500, MP 500 A, M 600, M 62, MP 64 (all products of Bayer AG, D 5090 Leverkusen). Other suitable macromolecular bases are the complexes of cyclic and acyclic crown ethers, cryptands, podands and phase-transfer catalysts which are onium compounds (such as sulfonium, ammonium and phosphonium compounds) substituted with metal compounds and ammonium compounds of the type mentioned above and in which the crown ether, cryptand, podand and onium compound units are attached by covalent bonds to a macromolecular insoluble matrix (such as for example a styrene/divinyl benzene skeleton).

Mixtures of such catalysts may also be used.

The quantity in which the catalyst is used is generally between 1 and 200 g, preferably between 2 and 50 g and most preferably between 5 and 30 g of catalyst per mole of NCO-groups.

The water-soluble/water-miscible solvent used includes solvents based on ethers, preferably dioxane and tetrahydrofuran, and also the ethers of ethylene glycol, diethylene glycol or propylene glycol, as well as water-miscible solvents containing, for example, carboxylic acid dialkylamide, nitrile, keto and other groups.

Classes of suitable solvents include: water-soluble, aliphatic or cycloaliphatic acid amides containing from 1 to 10 carbon atoms, for example dimethyl formamide, diethyl formamide, N-methyl pyrrolidone, dimethyl acetamide, caprolactam, formamide (dimethyl formamide, dimethyl acetamide and N-methyl pyrrolidone are preferred); water-soluble ethers of ethylene glycol, diethylene glycol or propylene glycol and the cyclic ethers; tetrahydrofuran and 1,4-dioxane; water-soluble tetra-alkylated aliphatic ureas containing from 4 to 12 carbon atoms such as tetramethyl ureas or tetraethyl urea; water-soluble, aliphatic or cycloaliphatic sulfones or sulfoxides containing from 2 to 10 carbon atoms, such as tetramethylene sulfone or dimethyl sulfoxide; water-soluble aliphatic or cycloaliphatic phosphoric acid amides such as hexamethyl phosphoric acid triamide; acetonitrile; and water-soluble ketones, such as acetone, or partly water-soluble ketones, such as methyl ethyl ketone (MEK).

These solvents may also be mixed in any ratio. Of the solvents mentioned, it is preferred to use those which boil at temperatures below 250° C. and preferably at 64° to 165° C. under normal pressure, because this simplifies working up.

Preferred water-miscible solvents are dimethyl formamide, dimethyl acetamide, N-methyl pyrrolidone, tetramethylene sulfone, acetonitrile, acetone, 1,4-dioxane and tetrahydrofuran. Dimethyl formamide, acetonitrile, acetone and dioxane are particularly suitable and readily obtainable. It is less preferred to use the Zerewitinoff-active substances, such as caprolactam or formamide. It is possible, although generally less preferred, particularly where the process is carried out continuously, to use alkanols or phenols, such as 2-propanol, t-butanol or phenol as solvents or even co-solvents.

It is possible to use solvents which are not completely miscible or only slightly miscible with water (for example, propionitrile, methyl ethyl ketone, ethyl acetate or hydrocarbons) in small quantities in order to facilitate the phase separation at room temperature of two-phase reaction mixtures.

It is preferred that the solvent be used in a quantity which is at least 10, more preferably at least 20 and, most preferably at least 40 parts of solvent for every 100 parts of NCO-compound. The water and, optionally, the solvent should be used in a quantity such that a substantially homogeneous (at most slightly clouded) or, preferably, a completely homogeneous, clear solution containing the NCO-compound and water is formed at the reaction temperatures.

The catalytically active insoluble compounds are generally suspended in the solvents and water. Addition to the compound containing isocyanate groups is possible in certain cases, but not preferred.

To hydrolyze the NCO-compound to form polyamines having a sufficiently high amine number (high conversion rate), it is favorable to maintain a concentration of the NCO-compound of $\leq 66$ wt %. The higher the degree of dilution during the hydrolysis reaction, the higher the conversion of the NCO-groups into $NH_2$-groups. In practice, a limit to the degree of dilution is imposed by the degree of economy required at the working-up stage. This limit is approximately a 3% solution.

In any event, the solvent should be used at least in a quantity such that during the NCO-hydrolysis reaction a substantially homogeneous and preferably completely homogeneous reaction mixture remains.

In a less preferred embodiment, compounds containing "H-active groups" and two or more hydroxy amino and/or thiol groups may be added to the reaction mixture. Compounds of this type were mentioned previously as synthesis components for the NCO-compounds used in the process of the present invention. Difunctional to optionally tetrafunctional compounds having a molecular weight in the range from 32 to 2000, particularly those containing at least two primary hydroxy groups (for example, ethane diol, butane diol, propane diol, polyethylene glycols, trimethylol propane and the like) are preferred. It is of course also possible to use compounds containing different "H-active groups", for example amino ethanols.

Compounds containing only one H-active group, for example methanol, ethanol, cyclohexanol, cyclohexyl amine, aniline, asymmetrical dimethyl hydrazine, dimethylaminopropyl amine, may be used as monofunctional chain terminators.

Pre-extension (i.e., isocyanate and already-formed amine react with chain attachment to form ureas) can occur as a secondary reaction in the process of the present invention. This secondary reaction may be largely suppressed by working in dilute solution, by using the appropriate catalysts and by maintaining relatively high reaction temperatures (for example in the range from 80° to 130° C.). Although it is desirable that secondary reactions of this nature should take place to the least possible extent, a certain degree of pre-extension is acceptable on economic grounds.

The reaction according to the present invention is preferably carried out in homogeneous phase. By slightly overgauging the quantity of water or the quantity of the NCO-compound, slight clouding of the reaction mixture may be obtained (apart from the clouding attributable to the insoluble catalysts) because the starting materials are no longer completely dissolved. However, if the reaction according to the invention is carried out in heterogeneous phase (for example by the excessive addition of water with precipitation of the NCO-prepolymer), unsatisfactory products are obtained. The optimal mixing ratios, which depend upon the starting compounds used, may readily be determined by a few preliminary tests.

The hydrolysis reaction may be carried out at temperatures below 165° C., for example at temperatures in the range from 50° to 165° C. However, it is preferably carried out at temperatures in the range from 80° to 130° C. because the best volume/time yields coupled with high solubility and, surprisingly, minimal extension of the ureas are obtained at temperatures in that range. It is particularly preferred to carry out the reaction at the boiling point of the mixture which, due to the presence of water, is generally in the range from about 90° to 105° C. In some cases, it may even be necessary to carry out the reaction under pressure in order to obtain sufficiently high temperatures.

The onset of the reaction is recognizable by the almost spontaneous elimination of $CO_2$ which is actually observed at low temperatures, for example 20° C. However, it is considerably more favorable to carry out the reaction at the higher temperatures indicated in order to suppress urea formation. It is important to ensure that the reactants are mixed rapidly and very thoroughly to form a homogeneous solution, which for the most part must be done by using the solvents. Reduction in viscosity also occurs when the higher temperatures are applied. The reaction may be carried out either continuously or in batches.

In one batch-type procedure, the NCO-group-containing compound is introduced into the aqueous mixture containing solvents and catalysts. This may be done by means of a dropping funnel or by mechanical injection using a nozzle provided that the reactants are thoroughly distributed by intensive stirring.

It is also possible to introduce the NCO-group-containing compound optionally containing a catalyst, optionally in part only into the reaction vessel preferably at room temperature. The solvent/water mixture optionally containing a catalyst, optionally in part only may then be added. The reaction may then be carried out at 10° to 150° C. In another embodiment, after addition of the reactants at a low temperature (for example −10° to +15° C.) is completed, the reaction mixture is heated to elevated temperatures.

In a continuous embodiment, which is particularly suitable for large-scale production, the NCO-compounds (optionally in the form of a solution) and the aqueous solution are separately delivered to a common reaction zone, intensively mixed (for example by means of a flow mixer) and reacted and then rapidly discharged from the mixing zone. The components may be metered, for example, by means of graduated dropping funnels or by means of a piston and/or diaphragm metering pump or any other metering unit. In the case of continuous metering, it is preferred to mix, react and discharge the two components from the reaction zone very quickly (in seconds or fractions of a second) using a suitable, optionally mechanical unit. In a continuous process such as this, it is not advisable to introduce the catalyst into the reaction zone through one of the reaction components. The solid insoluble catalysts may be present in finely suspended form or may be used in the form of a packing of the type normally used in the case of ion exchanger resins.

Various additives may be used to facilitate the reaction of the isocyanate groups with the aqueous solvent phase in which the catalyst is present in suspended or solid form (for example as an ion exchanger). Thus, one or more standard commercial emulsifiers may be used in quantities of from 0.01 to 1 part by weight to 100 parts of reaction mixture to homogenize the mixture. However, this is not necessary where homogeneous reaction mixtures (dissolved NCO-compound) are used.

On completion of mixing, the mixture obtained may be directly worked up into the polyamine or, alternatively, may even be left to after-react for a short time of generally less than 5 minutes. In the latter case, the reaction mixture is preferably refluxed gently under normal pressure in order to separate off all the carbon dioxide formed. However, the reaction mixture may also be heated for longer periods without any disadvantage. The reaction mixture is preferably worked up immediately after mixing.

Since the catalyst is substantially completely insoluble, filtration may be carried out immediately, i.e. while the reaction mixture is still hot, or even after cooling. This may be done for example by passing the reaction mixture through a filter built into the reaction vessel so that the catalyst is left behind. However, filtration may also be carried out after working up. Where filtration is carried out before distillation, it does not matter whether the reaction mixture represents a single-phase or two-phase system.

Working up may also be carried out continuously or in batches. The reaction mixture is normally worked up by distillation, by extraction, by phase separation or by a combination of these methods.

The volatile constituents cf the product-containing mixture are distilled off, optionally under reduced pressure. In general, sump temperatures (in the residual polyamine) of from 100° to about 130° C. are maintained towards the end of the concentration-by-evaporation phase.

Extraction processes, optionally after dilution with water, may be carried out using water-insoluble solvents (such as methylene chloride or chlorobenzene) but are not recommended.

Phase separation of the reaction mixture by cooling occurs in some cases if hydrolysis has been carried out at relatively high temperatures and in the presence of a relatively large quantity of water at the solubility limit. Phase separation may be improved or even brought about by addition of water or even by the addition of water-insoluble or only partly water-insoluble solvents such as methyl ethyl ketone or ethyl acetate. The aqueous phase optionally containing solvent is separated off from the polyamine phase. In general, the aqueous phase may be directly re-used.

In addition to the polyamine, the polyamine phase may contain residues of the catalyst (unless it has been filtered off beforehand), a little water and possibly, solvent which may be completely removed by distillation, optionally in vacuo, or by thin-layer distillation. If catalysts are still present, they may be removed by filtration, for example using a pressure filter.

Due to its specific gravity, the basic insoluble catalyst is normally at the bottom of the reaction vessel in the "amine phase" which generally has a high specific gravity. It is therefore possible to ensure that one of the phases contains all the catalyst. However, it is also possible, particularly where very finely particulate compounds are used, for both the amine phase and the aqueous phase to contain fractions of catalyst.

If the NCO-group-containing compound still contains free, i.e. monomeric, isocyanate from its production, the monomeric amine formed therefrom may accumulate to a considerable extent in the water/solvent phase during working up by phase separation. In that case, the polyamine obtained by this simple working-up procedure is substantially free from monomer. In that case, it is advisable to remove monomeric amine from the aqueous solution before the aqueous solution is re-used.

The polyamines obtained in accordance with the present invention after the working-up operation are generally colorless to faintly colored, medium- to high-viscosity, optionally relatively high-melting products. Depending upon the starting materials used, these polyamines additionally contain urethane and/or urea and-/or uret dione and/or isocyanurate and/or biuret groups and, optionally, ether and/or acetal and/or carbonate and/or ester and/or thioether and/or dialkyl siloxane groups and/or residues of the polybutadienes which were originally present in the NCO-compounds. Additional bonds can be formed by secondary reactions, for example urea groups can be formed from already hydrolyzed fractions and residual NCO-groups during the hydrolysis reaction. The quantity of primary aromatic amino groups present in the product polyamine corresponds at most to the quantity of NCO-groups in the NCO-compounds, i.e. from 0.19 to 20.3 wt % $NH_2$, preferably 0.46 to 11.3 wt % $NH_2$ and, most preferably, 0.58 to 6.7 wt % $NH_2$.

NCO-groups attached to aliphatic radicals give highly reactive aliphatic amines as hydrolysis products which react off very quickly with NCO-groups still present to form urea compounds and hence generally give relatively high molecular weight polyurea amines having in many cases a low $NH_2$-content.

By virtue of their low vapor pressure, the polyamines obtained by the process of the present invention are particularly useful as reactants for optionally blocked polyisocyanates in the production of polyurethanes (polyurethane ureas), optionally cellular polyurethane plastics or polyurethane foams. Suitable starting components for the production of polyurethane plastics have been described above in connection with the production of the prepolymers and also in German Offenlegungsschriften Nos. 2,302,564; 2,432,764 (U.S. Pat. No. 3,903,679); 2,639,083; 2,512,385; 2,513,815; 2,550,796; 2,550,797; 2,550,833; 2,550,860 and 2,550,862. These publications also teach auxiliaries and additives of the type which may optionally be used in the production of polyurethanes.

The present invention also relates to the production of polyurethane (urea)s using the polyamines produced in accordance with the invention. They may be used, for example, for elastomers, coatings, filaments spun from melts, solutions, dispersions or as a mixture of reactive components.

The polyamines produced in accordance with the present invention may also be used, for example, as coupling components for diazo dyes, as hardeners for epoxide and phenolic resins and in any other known reactions involving amines, such as amide or imide formation or others.

The process according to the invention is illustrated by the following Examples. Unless otherwise indicated, the quantities given therein represent parts by weight or percentages by weight.

EXAMPLES

Examples 1 To 3

In each of these three examples, a mixture of 1500 ml of dimethyl formamide, 250 g of water and basic aluminum oxide (according to Brockmann, activity stage I - Brockmann Company - Muttenz/Switzerland. Example 1: 10 g of Al₂O₃, Example 2: 29 g of aluminum oxide, Example 3: 100 g of Al₂O₃) was introduced into the reaction vessel and heated to 90° C. 500 g of an NCO-prepolymer having an NCO-content of 3.8% were added to this mixture over a period of 30 minutes with intensive stirring. There was vigorous evolution of gas and the reaction mixture was free from NCO immediately after addition cf the NCO-component. The aluminum oxide was filtered off while the reaction mixture was still hot. When the reaction mixture had cooled to 20° C., it separated into two phases. The upper phase (approximately 1400 to 1500 ml) was separated off and discarded. The solvent was removed from the lower phase first at 100° C./15 mbar and then at 100° C./0.1 mbar. The properties of the product amine are given in Table I.

The NCO-prepolymer employed in each of these examples was produced by combining tolylene-2,4-diisocyanate and a linear polypropylene glycol (OH-number 56) in an NCO:OH-ratio of 2:1 at 20° C., followed by heating for 4 hours at 80° C.

Example 4

A mixture of 1500 ml of dimethyl formamide, 250 ml of water and 28 g of Brite-sorb ® (a synthetic magnesium silicate made by the Philadelphia Quartz Company, U.S.A.) was introduced into the reaction vessel and heated to 90° C. 500 g of the NCO-prepolymer used in Examples 1-3 were added dropwise with intensive stirring. Removal of the catalyst, phase separation and isolation of the product were carried out in the same way as in Example 1. The properties of the product amine are given in Table 1.

Example 5

A mixture of 1500 ml of dimethyl formamide, 250 ml of water and 143 ml of a basic ion exchanger resin Lewatit ® M 500 KR/OH (a product of Bayer AG, D 5090 Leverkusen) heated to 90° C. was introduced into the reaction vessel. 500 g of the NCO-prepolymer used in Example 1 were added to the mixture with intensive stirring. Addition of the NCO-prepolymer was accompanied by vigorous evolution of $CO_2$. Removal of the catalyst, phase separation and isolation of the product were carried out in the same way as in Example 1. The properties of the product amine are given in Table 1.

Example 6

Example 5 was repeated using 200 ml of the basic ion exchanger resin Lewatit ® MP 64 (a product of Bayer AG) instead of Lewatit ® M500. The properties of the product amine are given in Table 1.

Example 7

A vertically arranged heatable glass column 60 cm long and 5 cm in diameter, which was provided at its lower end with a coarse sintered glass disc and which was open at its upper end, was filled with 300 ml of moist basic ion exchanger resin (Lewatit ® MP 64) and 200 g of Raschig rings of medium size and heated to 90° C. A solution kept at 15° C. of 1 liter of dimethyl formamide, 250 g of the NCO-prepolymer used in Example 1 and 50 g of water was passed through the column over a period of 20 minutes. The eluate was freed from solvent by distillation. The properties of the product amine are given in Table 1.

TABLE 1

| Example | 1 | 2 | 3 | 4 | 5 | 6 | 7 |
|---|---|---|---|---|---|---|---|
| Yield [% of the theoretical] | 99 | 99 | 99 | 100 | 89 | 84 | 71[6] |
| Primary nitrogen [%][1] | 0.74 | 0.83 | 0.93 | 0.95 | 0.86 | 0.88 | 0.82 |
| Total nitrogen [%][2] | 2.45 | 2.44 | 2.57 | 2.48 | 2.51 | 2.50 | 2.56 |
| NH-number [mg of KOH/g][3] | 29.6 | 33.2 | 37.2 | 38.0 | 34.4 | 35.2 | 32.8 |
| NH-number [mg of KOH/g][4] | 29.1 | 32.4 | 36.7 | 38.0 | 33.7 | 34.4 | 33.6 |
| Water content [%][5] | 0.25 | 0.06 | <0.05 | 0.18 | 0.11 | <0.05 | 0.1 |
| Viscosity [mPa · s/75° C.] | 5430 | 1863 | 1550 | 623 | 902 | 790 | 1723 |

[1]Titration with $HClO_4$
[2]According to Dumas
[3]Calculated from[1]
[4]Acetanhydride method
[5]According to Karl Fischer
[6]More product by washing out the column with $CH_2OH$ with example

Example 8

A mixture of 1.3 liters of acetonitrile, 200 g of water and 50 g of basic aluminum oxide (activity stage I, a product of the Woelm Company, D-344 Eschwege) was introduced into the reaction vessel and refluxed with intensive stirring. 500 g of a polymer having an NCO-content of 6.6% were added over a period of 35 minutes, during which carbon dioxide was vigorously given off. The reaction mixture was free from NCO immediately after addition of the NCO-prepolymer. The suspended aluminum oxide was filtered off while the reaction mixture was still hot and the substrate which was two phases at room temperature was freed from the solvents by distillation at 20 mbar/100° C. and then at 0.15 mbar/100° C. (bath temperature). The properties of the product amine are given in Table 2.

The NCO-prepolymer used in this Example was produced from a polytetramethylene glycol ether diol having an OH-number of 112 and 2,4-diisocyanatotoluene in a molar ratio of 1:2 by combining the two components at room temperature, followed by heating for 4 hours at 80° C.

Example 9

A mixture of 2 liters of acetonitrile, 250 g of water and 50 g of basic aluminum oxide (activity stage I, a product of the Woelm Company, D-344, Eschwege) was introduced into the reaction vessel and refluxed with intensive stirring. 500 g of an NCO-prepolymer (NCO-content 11.2%) heated to 40° C. were introduced over a period of 60 minutes during which carbon dioxide was vigorously given off. The reaction mixture was free from NCO immediately after addition of the NCO-prepolymer. Working up was carried out in the same way as described in Example 8. The properties of the product amine are given in Table 2.

The NCO-prepolymer used was produced from a linear polypropylene glycol (OH-number 265) and 2,4-diisocyanatotoluene in a molar ratio of 1:2 by combining the two components at room temperature, followed by heating for 4 hours at 80° C.

Example 10

A mixture of 1.5 liters of acetone, 250 g of water and 75 g of basic aluminum oxide was introduced into the reaction vessel and refluxed with intensive stirring. 500 g of a prepolymer heated to 50° C. and having an NCO-content of 5.6% were then added over a period of 45 minutes during which carbon dioxide was vigorously given off. The reaction mixture was free from NCO immediately after addition of the NCO-prepolymer. Working up was carried out in the same way as described in Example 8. The properties of the product amine are given in Table 2.

The NCO-prepolymer used in this Example was produced from a linear polypropylene glycol (OH-number 112) and an approximately 1:2 mixture of 4,4'-diisocyanatodiphenylmethane and 2,4'-diisocyanatodiphenylmethane in a molar ratio of 1:2 by combining the two components at room temperature and then heating for 4 hours at 80° C.

Example 11

A mixture of 1.53 liters of dioxane, 150 g of water and 125 g of Brite-sorb ® (see Example 4) was introduced into the reaction vessel and then heated with intensive stirring to 80° C. 750 g of an NCO-prepolymer (NCO-content 3.3%) heated to 50° C. were then introduced over a period of 90 minutes, during which carbon dioxide was vigorously released. The reaction mixture was free from NCO immediately after addition of the NCO-prepolymer. The catalyst was filtered off from the reaction mixture while it was still hot. Further working up was carried out in the same way as described in Example 8. The properties of the product amine are given in Table 2.

The NCO-prepolymer used in this Example was produced from a linear polypropylene glycol (OH number 56) and 2,4'-diisocyanatodiphenyl sulfide in a molar ratio of 1:2 by combining the two components at room temperature, followed by heating for 4 hours at 80° C.

Example 12

1.4 liters of a solution of 700 g of a trimer of 2,4-diisocyanatotoluene (NCO-content 20.3%, "Desmodur IL" ®, a product of Bayer AG) in 700 ml of dioxane were added over a period of 30 minutes with intensive stirring to a mixture heated to 95° C. of 1.65 liters of dimethyl formamide, 350 g of water and 125 g of Brite-sorb ®. The reaction mixture was free from NCO immediately after addition of the NCO-adduct. Vigorous evolution of gas occurred. The reaction mixture was worked up in the same way as described in Example 8. The properties of the product amine are given in Table 2.

Example 13

900 g of an NCO-prepolymer (NCO-content 3.0%) heated to 50° C. were added over a period of 60 minutes with vigorous stirring to a mixture heated to 90° C. of 2.7 kg of dimethyl formamide (DMF), 450 ml of water and 200 g of basic aluminum silicate "Brite-sorb" ® (see Example 4). Addition of the NCO-prepolymer was accompanied by the vigorous evolution of carbon dioxide. The NCO-prepolymer had been produced from a polyester of adipic acid, ethylene glycol and 1,4-butane diol (molar ratio of ethylene glycol to 1,4-butane diol 1:1) and 2,4-diisocyanatotoluene in a molar ratio of 1:2 by adding the liquid polyester to polyisocyanate heated to 80° C., followed by heating of the mixture for 3 hours at 80° C. The catalyst was filtered off from the reaction mixture after cooling to 60° C. Water and DMF were distilled off under reduced pressure, after which the reaction mixture was taken up in 250 ml of toluene and re-distilled. The properties of the product amine are given in Table 2.

Example 14

500 g of an NCO-prepolymer (NCO-content 5.0%) heated to 40° C. were added with intensive stirring over a period of 120 minutes to a mixture heated to 90° C. of 1.5 l of dimethyl formamide, 250 g of water and 100 g of basic aluminum silicate "Brite-sorb" ®. The reaction mixture which had a temperature of 70° C. and was free from NCO immediately after addition of the NCO-prepolymer was filtered in order to separate off the catalyst. The solvent was distilled off at 20 mbar/100° C. and then at 1 mbar/100° C. The properties of the product amine are given in Table 2.

The NCO-prepolymer used in this Example was obtained by combining 1,6-diisocyanatohexane and a linear polypropylene glycol (OH number 112) at room temperature in an NCO:OH ratio of 6:1, heating for 8 hours at 100° C. and then distilling off the excess monomeric diisocyanate under reduced pressure using a thin-layer evaporator.

TABLE 2

| Example | 8 | 9 | 10 | 11 | 12 | 13 | 14 |
|---|---|---|---|---|---|---|---|
| Yield [%] | 99 | 99 | 99 | 99 | 99 | 99 | 99 |
| Primary nitrogen [%][1] | 1.01 | 1.83 | 1.24 | 0.76 | 5.91 | 0.86 | 1.23 |
| Total nitrogen [%][2] | 4.50 | 8.36 | 4.00 | 2.28 | 16.12 | 2.49 | 3.46 |
| NH-number [mg of KOH/g][3] | 40.4 | 73.2 | 49.6 | 30.4 | 236.4 | 34.4 | 49.2 |
| NH-number [mg of KOH/g][4] | 40.7 | 72.9 | 50.0 | 30.5 | 238 | 35.3 | 50.3 |
| Water content [%][5] | 0.23 | 0.14 | 0.34 | 0.08 | 0.11 | 0.05 | 0.17 |
| Viscosity (mPa · s/75° C.)[6] | 2300 | 25000 | 1300 | 510 | —[7] | —[7] | 1040 |

[1-5] Same as in Table 1
[6] at 75° C.
[7] resin

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A single stage process for the production of primary polyamines containing aromatic and/or aliphatic amino groups comprising hydrolyzing a mixture of
   (a) an isocyanate group containing compound having an NCO-content of from 0.5 to 40 wt %,
   (b) water,
   (c) a basic compound which is substantially insoluble in water and organic solvents, and
   (d) a water-miscible solvent.

2. The process of claim 1 in which the mixture further comprises from 0.1 to 15 wt % (based on isocyanate compound (a)) of a compound containing from 1 to 4 isocyanate-reactive hydrogen atoms and having a molecular weight of from 32 to 2000.

3. The process of claim 1 in which the isocyanate compound (a) has an NCO-content of from 1.2 to 25 wt %.

4. The process of claim 1 in which the isocyanate compound (a) has an NCO-content of from 1.5 to 15 wt %.

5. The process of claim 1 in which the isocyanate compound (a) is in solution in an NCO-inert solvent.

6. The process of claim 1 in which the basic compound is selected from the group consisting of insoluble alkaline earth carbonates, insoluble earth metal oxides, insoluble dioxides of the spinel type, alkaline earth silicates, alkaline earth metal silicates, organic high molecular weight anion exchanger resins and mixtures thereof.

7. The process of claim 1 in which the pH-basic compound (c) is selected from the group consisting of basic aluminum oxide, basic magnesium silicate, basic ion exchanger resins and mixtures thereof.

8. The process of claim 1 in which water is used in a quantity which is at least 10 times the stoichiometric amount.

9. The process of claim 1 in which the water-miscible solvent boils below 250° C. and contains at least one group selected from the group consisting of cyclic carboxylic acid-N,N-dialkylamide, acyclic carboxylic acid-N,N-dialkylamide, lactam, tetraalkyl urea, sulfone, sulfoxide, phosphoric acid-N,N-dialkylamide, nitrile, keto and ether groups and combinations thereof.

10. The process of claim 1 in which the mixture is hydrolyzed at a temperature of from 50° to 165° C.

11. The process of claim 1 in which the isocyanate compound (a) is an NCO-prepolymer containing from 1.5 to 15 wt % aromatically bound NCO-groups.

12. The process of claim 11 in which the NCO-prepolymer is based on a relatively high molecular weight compound selected from the group consisting of difunctional polyethers, trifunctional polyethers and polyester, polycarbonate and polycaprolactone polyols and mixtures thereof.

13. The process of claim 1 in which the isocyanate compound (a) contains NCO-groups bound to an aromatic ring of a tolylene or diphenylmethane structure.

* * * * *